(12) United States Patent
Jaeger-Wayboer

(10) Patent No.: US 9,060,615 B1
(45) Date of Patent: Jun. 23, 2015

(54) HEADBOARD BRACKET PAD FOR A BED FRAME

(71) Applicant: Brenda Jaeger-Wayboer, Warren, MI (US)

(72) Inventor: Brenda Jaeger-Wayboer, Warren, MI (US)

( * ) Notice: Subject to any disclaimer, the term of this patent is extended or adjusted under 35 U.S.C. 154(b) by 0 days.

(21) Appl. No.: 14/525,251

(22) Filed: Oct. 28, 2014

Related U.S. Application Data

(60) Provisional application No. 61/924,840, filed on Jan. 8, 2014.

(51) Int. Cl.
*A47C 19/02* (2006.01)
*A47C 21/00* (2006.01)
*A47C 31/00* (2006.01)

(52) U.S. Cl.
CPC ............. *A47C 19/02* (2013.01); *A47C 21/00* (2013.01); *A47C 31/00* (2013.01)

(58) Field of Classification Search
CPC ......... A47C 19/02; A47C 21/00; A47C 31/00
USPC ................ 5/424.663, 906, 922; 248/345.1
See application file for complete search history.

(56) References Cited

U.S. PATENT DOCUMENTS

| 3,144,236 | A | * | 8/1964 | Clanin ........................ 150/154 |
| D299,393 | S | | 1/1989 | Sands |
| 5,044,025 | A | | 9/1991 | Hunsinger et al. |
| 5,508,078 | A | * | 4/1996 | Stalnaker ...................... 428/71 |
| 5,557,817 | A | | 9/1996 | Haddock |
| 5,749,112 | A | | 5/1998 | Metzler |
| 6,076,212 | A | | 6/2000 | Feld |
| 6,401,281 | B1 | | 6/2002 | Younge |
| 6,647,589 | B1 | * | 11/2003 | Youngwith ............... 16/18 CG |
| 8,028,362 | B1 | * | 10/2011 | Barreau et al. .................. 5/663 |
| 2005/0076445 | A1 | * | 4/2005 | MacEachern .................... 5/663 |

* cited by examiner

*Primary Examiner* — Michael Trettel
(74) *Attorney, Agent, or Firm* — Harness, Dickey & Pierce, P.L.C.

(57) ABSTRACT

A pad is releasably secured to a bed frame for covering the headboard bracket. The headboard bracket pad includes a padded body having a first panel and a second panel secured together with a flexible pad disposed therebetween. A mounting system is used to selectively attach the padded body to the bed frame to protect humans, walls, painted surfaces and animals from harm and/or injury resulting from an impact with the headboard bracket.

20 Claims, 2 Drawing Sheets

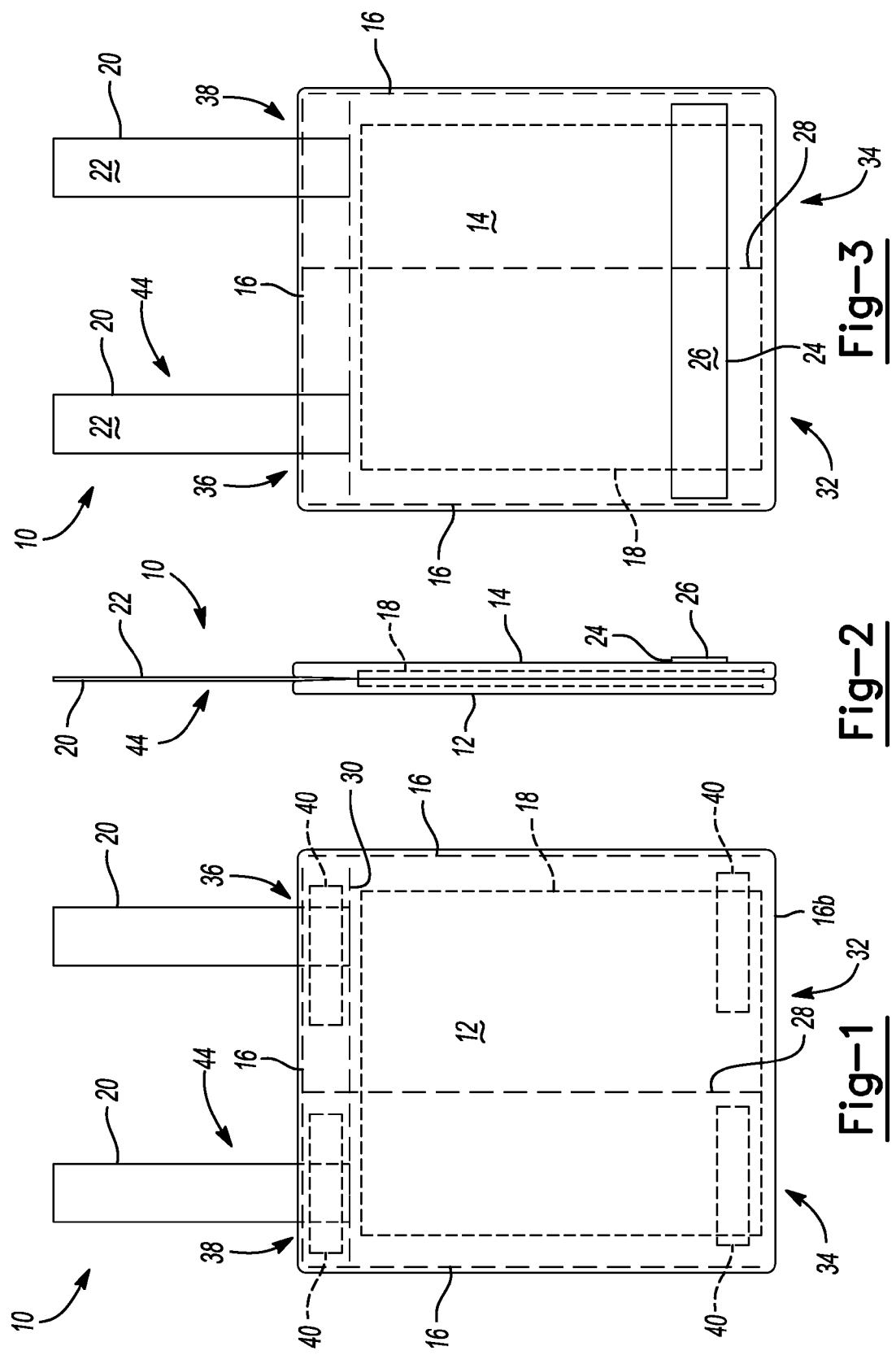

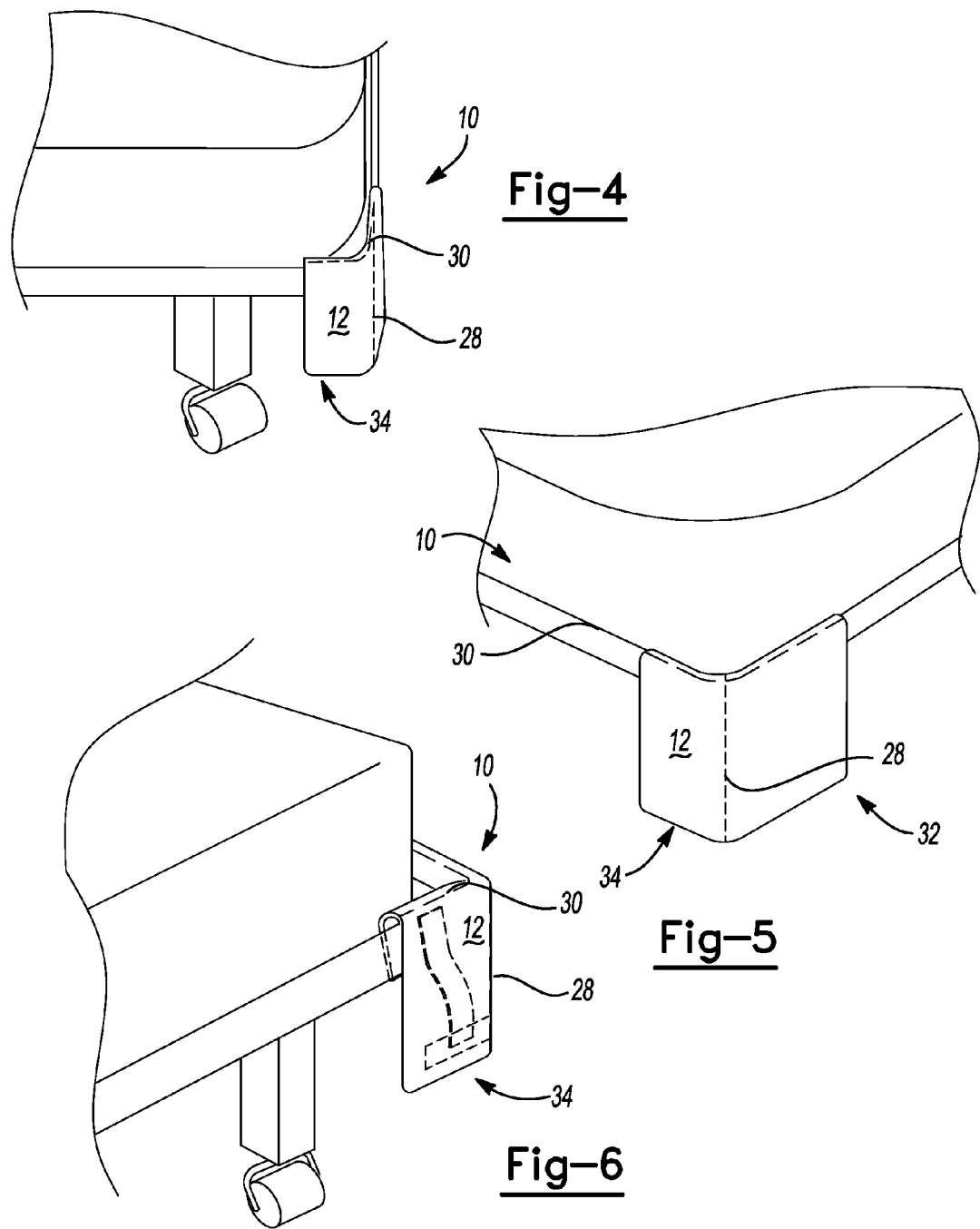

HEADBOARD BRACKET PAD FOR A BED FRAME

CROSS-REFERENCE TO RELATED APPLICATIONS

This application claims the benefit of U.S. Provisional Application No. 61/924,840, filed on Jan. 8, 2014. The entire disclosure of the above application is incorporated herein by reference.

FIELD

The present disclosure relates to bedding accessories and, more particularly, relates to a bracket pad configured to be detachably secured over the attachment structure for a headboard on a bed frame.

BACKGROUND AND SUMMARY

This section provides background information related to the present disclosure which is not necessarily prior art. This section provides a general summary of the disclosure, and is not a comprehensive disclosure of its full scope or all of its features.

Beds come in a variety of sizes, such as single, queen, king, and generally include a bed frame, box spring and mattresses therefor. Regardless of the size, most frames include some structure in the form of a bracket, flange, tube or other mechanism for securing a headboard thereto. This headboard attachment structure, hereinafter referred to as the headboard bracket, is often an integral part of the bed frame such that it cannot be removed when a headboard is not employed.

In these circumstances, the headboard bracket extends away from a vertical surface of the box spring and mattress such that the bracket is exposed. In some circumstances, movement of the bed during expected usage can cause the exposed bracket to bump into and damage an adjacent wall surface. In other circumstances, a person may bump into the exposed bracket when moving about the bed frame resulting in a minor injury from the impact. Padding for frame rails are known to consist basically of familiar, expected and obvious structural configurations well-known. For example, rubber pads or foam tubes have been configured to provide padding for the frame rails or bed rails. Similar, padded coverings have been developed for bed rails or headboards. Known examples of these devices are illustrated and described in, for example, U.S. Pat. No. 5,044,025; U.S. Pat. No. 5,557,817; U.S. Pat. No. 5,749,112; U.S. Pat. No. 6,076,212; U.S. Pat. No. 6,401,281; and U.S. Des. Pat. No. 299,393.

While these devices fulfill their respective, particular objectives and requirements, the aforementioned patents do not disclose a headboard bracket pad which is specifically adapted for attachment only over a headboard bracket and readily adaptable for use with almost any frame configuration. The headboard bracket pad in accordance with the teachings provided herein substantially departs from the concepts and designs of the prior art, and in so doing provides an apparatus primarily developed for the purpose of protecting the adjacent wall surface and preventing injury from stubbing into headboard bracket.

The headboard bracket pad includes a padded body having a first panel and a second panel secured together with a flexible pad disposed therebetween. In some embodiments, a pair of straps extends from a first edge of the padded body. Each strap has a first attachment mechanism. An anchor strip is secured to an outer surface of the first panel and has a second attachment mechanism formed on the strip such that the second attachment mechanism is operable to engage the first attachment mechanism for releasably securing the padded body over a headboard bracket. In some embodiments, one or more magnets can be used that is/are secured to or within the padded body to permit magnetic coupling of the padded body to the metallic bed frame.

The padded body is foldable along a longitudinal axis so as to form a first padded region and a second padded region generally perpendicular to the first padded portion. The padded body is also foldable along a transverse axis to form a third region generally parallel to and folded onto the first padded region and a fourth region generally parallel to and folded onto from the second padded region.

The essential function of the headboard bracket pad is to protect humans, walls, painted surfaces and animals from harm and/or injury resulting from an impact with the headboard bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a front view showing a first embodiment of the headboard bracket pad described herein;

FIG. 2 is a side view of the headboard bracket pad shown in FIG. 1;

FIG. 3 is a rear view of the headboard bracket pad shown in FIG. 1;

FIG. 4 is a side perspective view of the pad shown in FIG. 1 installed over the headboard bracket of a conventional bed frame;

FIG. 5 is a front perspective view of the pad shown in FIG. 1 installed over the headboard bracket of a conventional bed frame; and FIG. 6 is a rear perspective view of the pad shown in FIG. 1 installed over the headboard bracket of a conventional bed frame.

Corresponding reference numerals indicate corresponding parts throughout the several views of the drawings.

DETAILED DESCRIPTION

Example embodiments will now be described more fully with reference to the accompanying drawings. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features, elements, and/or components.

Although the terms first, second, third, etc. are used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-3, a headboard bracket pad 10 is shown to include a body portion having a front panel 12 and a back panel 14 stitched together along seams indicated at reference 16. In some embodiments, the front and back panels 12, 14 are part of a single piece of material folded along a bottom edge 16b, then stitched together along the side and top seams 16. A pad 18 is disposed within an interior region defined between front and back panels 12, 14.

In some embodiments preferred, the front panel 12 and back panel 14 are fabricated from an uncolored contract or commercial grade vinyl upholstery material which can be readily sewn together. In some embodiments, an uncolored material is preferred to prevent color transfer or marking of adjacent walls should the padded bed frame impact therewith. However, it should be understood that alternative materials may be used, including, but not limited to, cotton, man-made synthetics, leather, and the like. It should also be understood that alternative colors and/or patterns can be used, including various designs, logos (e.g. team logos, etc.), indicia, decals, colors, and the like. In some embodiments, the color and/or design can be configured to match that of the adjacent wall or structure.

In some embodiments, the pad 18 is an open-cell foam sheet. However, alternative pad materials are envisioned, including, but not limited to, closed-cell foam, natural materials, man-made materials, gels, or other materials typically used for impact management. In this configuration, the headboard bracket pad 10 remains sufficiently flexible and pliant to form and attached the headboard bracket pad 10 to a bed frame.

In some embodiments, as illustrated in FIGS. 1-3, a mounting system 44 is provided for coupling or otherwise attaching headboard bracket pad, specifically the body portion and pad 18, to the bed frame. In some embodiments, mounting system 44 can comprise a pair of flexible straps 20 extends from the upper edge of the headboard bracket pad 10. As illustrated, in some embodiments, the straps 20 extend into the interior region and are stitched into place along the top seam 16. An attachment mechanism 22 shown in FIGS. 2 and 3 is formed on one side of the straps 20. An anchor strip 24 is secured along a lower edge of the back panel 14 and has an attachment mechanism 26 which is complementary with the attachment mechanism 22 so that the straps may be releasably secured to the strip 24. In some embodiments, attachment mechanism 22 is a loop-type fastener which remains relatively flexible so that the straps 20 may be folded down over the headboard bracket pad 10 and attachment mechanism 26 is a hook-type fastener that cooperates with the loop-type fasteners of attachment mechanism 22. In some embodiments, the attachment mechanism 22 is a loop and hook type fasteners, such as Velcro® brand fasteners. However, in some embodiments, attachment mechanisms 22, 26 may be complementary closures or fasteners, such as snaps, hooks, buttons, or other selectively detachable features.

In some embodiments, straps 20 and anchor strip 24 can be replaced with one or more magnets 40 shown in phantom in FIG. 1. In some embodiments, mounting system 44 can comprise magnets 40 disposed within interior region and concealed from view. It should be understood that magnets 40 can be mounted on an exterior portion of body portion, such as back panel 14. Magnets 40 may be sized and placed in any manner for convenient coupling to a metallic bed frame. In some embodiments, magnets 40 can be sized and placed internally to be retained in position by stitched seams 16 and/or stitched lines 28, 30, which will be discussed in greater detail herein. In this way, magnets 40 can serve to selectively couple headboard bracket pad 10 to metallic bed frames.

In some embodiments, headboard bracket pad 10 is longitudinally foldable along line 28 as shown in FIGS. 1 and 3 so as to define a first padded region 32 for covering a front portion of the headboard bracket and a second padded region 34 generally perpendicular (when folded during installation) to the first padded portion 32 for covering a side portion of the headboard bracket. The padded headboard bracket pad 10 is also transversely foldable along line 30 shown in FIGS. 1 and 3 to define a third region 36 generally parallel to and overlaying the first padded region 32 and a fourth region 38 generally parallel to and overlaying the second padded region 34. The folded configuration of the headboard bracket pad 10 is illustrated in FIGS. 4-6. Once so folded, the flexible straps 20 or magnets 40 are wrapped over the bed frame and or headboard bracket to contact the anchor strip 24 or magnetically engage the bed frame. In some embodiments, attachment mechanisms 22, 26 engage each other for releasably securing the headboard bracket pad 10 to the bed frame so that the headboard bracket is covered.

The headboard bracket pad 10 may include stitching along the longitudinal line 28 to facilitate folding to form the first padded region 32 and second padded region 34. Such stitching may be centrally located so that the first padded region 32 and second padded region 34 are the same width, or may be offset so that the first padded region 32 has a different width than the second padded region 34. Likewise, the headboard bracket pad 10 may include stitching along the transverse line 30 to facilitate folding to form the third region 36 and fourth region 38. As presently preferred, the transverse line 30 is offset toward the top of the headboard bracket pad 10, nearer the flexible straps 20 or magnets 40. In some embodiments, headboard bracket pad 10 can be constructed in a left and right configuration to provide maximum fit and finish.

In some embodiments and without limitation to alternative sizes, the front panel 12 and the back panel 14 are formed by a single sheet of vinyl material which is 8⅜ inches wide by 16 inches long which is folded in half. The foam pad 18 is 6 inches wide by 5⅜ inches long and ½ inch thick. The thickness of the foam may vary in a range from about ¼ inch thick up to about 1 inch thick, depending on the level of padding desired. The flexible straps 20 are preferably commercial grade loop fastening strips (e.g. soft Velcro® brand strips) having a length of about 7½ inches and a width of about 1 inch. The anchor strap 24 is preferably a commercial grade hook fastener strip having a length of about 7⅜ inches and a width of about 1 inch.

The headboard pad 10 may be fabricated in the following manner. First, a vinyl sheet is folded in half and a line is marked on the back panel 14 about ½ inch up from and parallel to the bottom fold. Next, the vinyl sheet is unfolded, the anchor strap 24 is aligned on the line and stitched onto the back panel 14. Next, the vinyl sheet is folded so that the backing surface faces outwardly and the sides of the front and back panels 12, 14 are stitched to form a pouch with a pair of lateral hem.

Next, the foam pad 18 is placed into the pouch and the flexible straps are located along the upper edge of the pouch about one inch from each lateral hem and/or the magnets 40 are placed into the pouch. The upper edges of the front and back panel 12, 14 are turned inwardly into the pouch and stitched to enclose the foam pad 18 and magnets 40 within the pouch and/or secure the flexible straps 20 thereto. Longitudinal stitching and transverse stitching may be added to facilitate folding as described above. In some embodiments, foam pad 18 can extend upward only to transverse line 30 to eliminate bulk (and minimize material required) in third region 36 and fourth region 38. In such configuration, foam pad 18 only resides in first padded region 32 and second padded region 34. In some embodiments, foam pad 18 can extend upward beyond transverse line 30 such that foam pad 18 extended into third region 36 and fourth region 38. In this way, if desired, foam pad 18 can be continuous and stitched via transverse line 30 or can be separate pieces being disposed in one or more regions 32, 34, 36, 38.

Prior to installing the headboard bracket pad 10, any mattress and/or box spring should be removed from the bed frame. The pad 10 is place with the anchor strip 24 and/or back panel 14 facing the bed frame adjacent the headboard bracket. In some embodiments, the top portion of the pad 10 is wrapped over the frame bracket and positioned against the headboard bracket in the inside of the bed frame so that the flexible straps 20 hang down on the inside of the bed frame and/or the magnets 40 engage the metallic bed frame. The box spring and/or mattress are moved back into position, then the flexible straps 20 are secured to the anchor strip 24 for releasably securing the pad 10 to the headboard bracket as best seen in FIGS. 4-6. In some embodiments, the top portion of the pad 10 is wrapped over the frame bracket and positioned against the headboard bracket such that magnets 40 engage either the exterior or interior side of the frame bracket.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A headboard bracket pad for a bed frame comprising:
a padded body having a first panel and a second panel secured together with a flexible pad disposed therebetween; and
a mounting system operably coupled to said padded body, said mounting system selectively attaching said padded body to the bed frame, said mounting system comprises:
a pair of straps extending from a first edge of the padded body, each strap having a first attachment mechanism formed thereon; and
an anchor strip formed on an outer surface of the first panel and having a second attachment mechanism formed thereon, wherein the second attachment mechanism is operable to engage the first attachment mechanism on the pair of straps for releasably securing the padded body to a headboard bracket of the bed frame,
wherein the padded body is foldable along a longitudinal axis so as to define a first padded region and a second padded region generally perpendicular to the first padded portion, and
wherein the padded body portion is foldable along a transverse axis to define a third region generally parallel to and offset from the first padded region and a fourth region generally parallel to and offset from the second padded region.

2. The headboard bracket pad according to claim 1 wherein said first attachment mechanism and said second attachment mechanism comprises a hook and loop system.

3. The headboard bracket pad according to claim 1 wherein said first attachment mechanism and said second attachment mechanism comprises a snap system.

4. The headboard bracket pad according to claim 1 wherein said first attachment mechanism and said second attachment mechanism comprises a fastener system.

5. The headboard bracket pad according to claim 1 wherein said first attachment mechanism and said second attachment mechanism comprises a button system.

6. A headboard bracket pad for a bed frame comprising:
a padded body having a first panel and a second panel secured together with a flexible pad disposed therebetween; and
a mounting system operably coupled to said padded body, said mounting system selectively attaching said padded body to the bed frame, said mounting system comprises at least one magnet operably coupled to said padded body, said magnet releasably securing the padded body to a headboard bracket of the bed frame,
wherein the padded body is foldable along a longitudinal axis so as to define a first padded region and a second padded region generally perpendicular to the first padded portion, and
wherein the padded body portion is foldable along a transverse axis to define a third region generally parallel to and offset from the first padded region and a fourth region generally parallel to and offset from the second padded region.

7. The headboard bracket pad according to claim 6 wherein said at least one magnet is disposed internally between said first panel and said second panel.

8. The headboard bracket pad according to claim 6 wherein said at least one magnet comprises a plurality of magnets disposed internally between said first panel and said second panel within at least said third region and said fourth region.

9. The headboard bracket pad according to claim 8, further comprising:
a first stitch extending along said transverse axis and a second stitch extending along said longitudinal axis, said first stitch and said second stitch retaining said plurality of magnets within said third region and said fourth region.

10. The headboard bracket pad according to claim 6 wherein said at least one magnet comprises a plurality of magnets disposed internally between said first panel and said second panel within at least said first, second, third, and fourth regions.

11. The headboard bracket pad according to claim 10, further comprising:
a first stitch extending along said transverse axis and a second stitch extending along said longitudinal axis, said first stitch and said second stitch retaining said plurality of magnets within said first, second, third, and fourth regions.

12. A headboard bracket pad for a bed frame comprising:
a padded body having a first panel and a second panel secured together with a flexible pad disposed therebetween;
a mounting system operably coupled to said padded body, said mounting system selectively attaching said padded body to the bed frame; and
a stitch extending along a longitudinal axis,
wherein the padded body is foldable along said longitudinal axis so as to define a first padded region and a second padded region generally perpendicular to the first padded portion, and
wherein the padded body portion is foldable along a transverse axis to define a third region generally parallel to and offset from the first padded region and a fourth region generally parallel to and offset from the second padded region.

13. The headboard bracket pad according to claim 12 wherein said flexible pad comprises an open-cell foam.

14. The headboard bracket pad according to claim 12 wherein said flexible pad comprises a closed-cell foam.

15. The headboard bracket pad according to claim 12 wherein said flexible pad comprises a gel.

16. The headboard bracket pad according to claim 12 wherein said flexible pad is contained only in said first and second regions.

17. The headboard bracket pad according to claim 12 wherein said flexible pad is contained in said first, second, third, and fourth regions.

18. A headboard bracket pad for a bed frame comprising:
a padded body having a first panel and a second panel secured together with a flexible pad disposed therebetween;
a mounting system operably coupled to said padded body, said mounting system selectively attaching said padded body to the bed frame; and
a stitch extending along a transverse axis,
wherein the padded body is foldable along a longitudinal axis so as to define a first padded region and a second padded region generally perpendicular to the first padded portion, and
wherein the padded body portion is foldable along said transverse axis to define a third region generally parallel to and offset from the first padded region and a fourth region generally parallel to and offset from the second padded region.

19. The headboard bracket pad according to claim 18 wherein said flexible pad is contained only in said first and second regions.

20. The headboard bracket pad according to claim 18 wherein said flexible pad is contained in said first, second, third, and fourth regions.

* * * * *